United States Patent [19]

Meyn

[11] 4,059,868
[45] Nov. 29, 1977

[54] APPARATUS FOR CUTTING OPEN A FOWL

[76] Inventor: Pieter Meyn, Noordeinde 68, Oostzaan, Netherlands

[21] Appl. No.: 733,362

[22] Filed: Oct. 18, 1976

[30] Foreign Application Priority Data

Nov. 25, 1975 Netherlands .......................... 7513767

[51] Int. Cl.² ............................................. A22C 21/00
[52] U.S. Cl. ................................................. 17/11; 17/52
[58] Field of Search ........................................ 17/11, 52

[56] References Cited

U.S. PATENT DOCUMENTS

| | | | |
|---|---|---|---|
| 2,434,587 | 1/1948 | Riordan | 17/11 |
| 2,795,815 | 6/1957 | Dahlberg | 17/11 |
| 3,237,664 | 3/1966 | Macy et al. | 17/52 |
| 3,460,193 | 8/1969 | Yoshida | 17/52 |
| 3,540,074 | 11/1970 | Lawson | 17/11 |
| 3,624,863 | 12/1971 | Gasbarro | 17/52 |
| 3,689,961 | 9/1972 | Crane | 17/11 |
| 3,806,988 | 4/1974 | Harben, Jr. | 17/11 |
| 3,816,874 | 6/1974 | Jalnke | 17/11 |
| 3,886,635 | 6/1975 | Meyn | 17/11 |
| 3,958,302 | 5/1976 | Meyn | 17/11 |

Primary Examiner—Jay N. Eskovitz
Assistant Examiner—Paul J. Hirsch

[57] ABSTRACT

A revolving apparatus for automatically cutting open fowl hanging by the ankle joints from an overhead conveyor, having a number of cutting units regularly spaced about the circumference of the apparatus. The cutting units work in succession as they revolve about the central shaft of the apparatus moving along with the conveyor. Each cutting unit is also vertically movable down towards a fowl carried by the conveyor and away again from the fowl. Each cutting unit carries a ball shaped protrusion consisting of two separatable ball halves, one of which carries a knife in its upper part facing away from the other ball half. During the downward movement of each cutting unit it's closed ball halves are inserted into an opening in the fowl previously made by cutting out it's vent, whereafter the ball halves are spread and the fowl is cut open by the knife. The penetration depth of the ball halves is automatically adapted to the size of the fowl by means of an abutment member carried by each cutting unit and gripping between the fowl's legs. The abutment member stops the downward movement of the cutting unit when it comes to bear on the body of the fowl.

15 Claims, 3 Drawing Figures

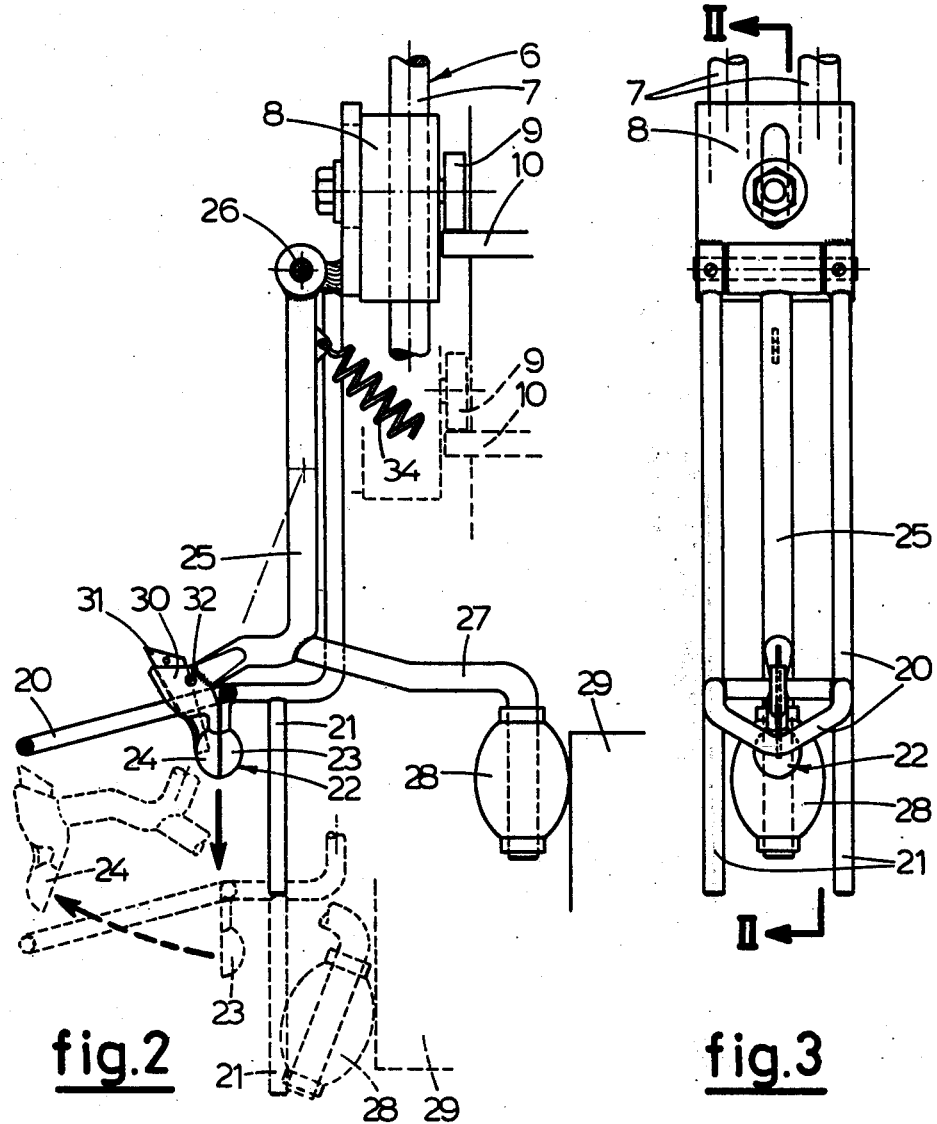

4,059,868

APPARATUS FOR CUTTING OPEN A FOWL

BACKGROUND OF THE INVENTION

The invention relates to an apparatus for cutting open th body cavity of a fowl, which is hanging by the ankle joints from a hook of an overhead conveyor and the vent of which has been cut out. More particular the invention relates to a revolving automatic apparatus of the type having a plurality of cutting means each attached to a slide block mounted for movement down towards a fowl carried by the conveyor on a guide means moving along in synchronisation with the conveyor.

The known apparatusses of this kind all have the disadvantage of a relatively complicated construction with a great number of moving parts, which of course makes these apparatusses expensive and unreliable in operation.

Because of the increasingly stringent official regulations relating to hygiene and especially to the prevention of cross contamination the body cavity of the fowl has to be cut open with the utmost care in order to prevent the fowl's entrails from being touched by the knife of the cutting means. Therefore the most important disadvantage of the known apparatusses is that, notwithstanding their complicated construction, they are not able to cut open the body cavity of the fowl in such manner that damage to the entrails is prevented with absolute certainty.

SUMMARY OF THE INVENTION

The invention has as it's main object to remove the disadvantages hereinbefore described.

According to the invention this object is attained with an apparatus of the type referred to having cutting means each comprising a generally ball shaped protrusion consisting of two laterally separatable halves, which during the downward movement of the slide block are inserted into the opening previously made in the fowl by cutting out it's vent, whereafter the ball halves are separated and the fowl is cut open by a knife mounted in at least one of the ball halves. Since the protrusion is generally ball shaped it will push away the fowl's entrails without damaging these, so that the entrails are brought out of reach of the knife, which is mounted in the upper part of it's respective ball half.

Preferably the separating movement of the ball halves is so directed, that the fowl is cut open from it's vent towards it's breast bone. It further is of advantage if one of the ball halves is rigidly connected with the slide block, whereas the other ball half is attached to the free end of a lever arm pivotably connected with the slide block, so that the ball halves may be spread apart in the manner of a pair of scissors. Preferably the arm is provided with a follower co-operating with a stationary camming surface, shaped in such manner that the ball halves are spread and closed as desired in synchronisation with the movements of the slide block.

Advantageously the downward movement of the slide block is at least partially attained through the force of gravity, the distance over which the slide block is lowered during it's downward movement being determined by an abutment member attached to the slide block and extending between the fowl's legs, which stops the downward movement of the slide block when it comes to bear on the fowl's body. Thus the penetration depth of the protrusion is always the same irrespective of the fowl's size as the downward stroke of the slide block is automatically adapted to the size of the fowl.

Finally it is of advantage if the apparatus is build in the manner of a merry-go-round and carries a plurality of cutting means regularly spaced about it's circumference and working in succession as the apparatus revolves, the apparatus being arranged to be driven by the conveyor. Preferably the slide block of each cutting means is provided with a follower co-operating with a stationary camming track for controling the upward movement of the slide block.

BRIEF DESCRIPTION OF THE DRAWINGS

Further features and advantages of the invention will become apparent from the following description of a preferred embodiment of the invention taken in connection with the accompanying drawings, in which:

FIG. 2 is an enlarged side view of one of the cutting means of the apparatus shown in FIG. 1, as seen from the line II—II in FIG. 3; and FIG. 3 is an enlarged front view of the cutting means shown in FIG. 2.

DETAILED DESCRIPTON OF THE PREFERRED EMBODIMENT

Figure 1:
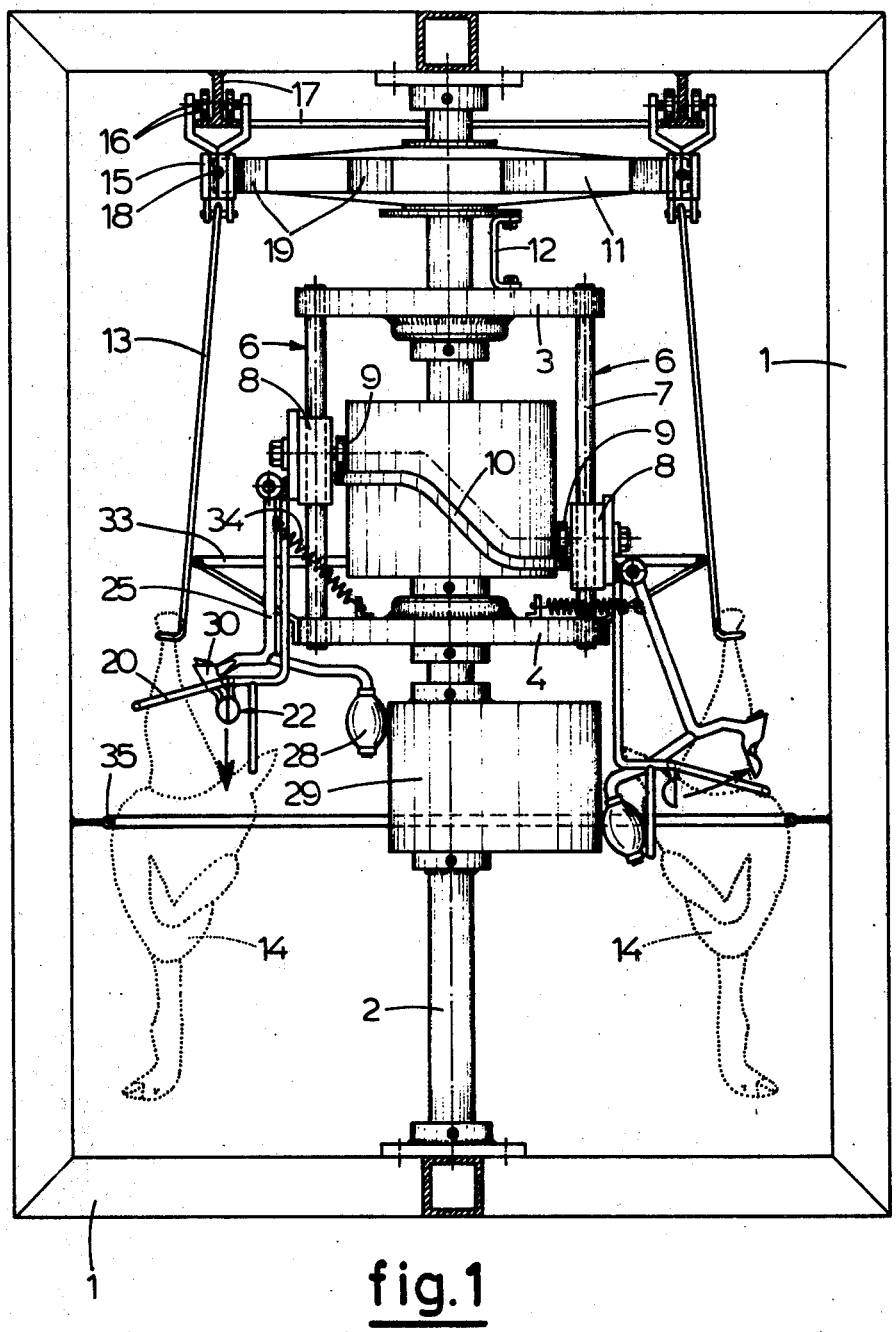
FIG. 1 is a side view of an apparatus according to the invention, for reasons of clarity only showing two of the cutting means.

The apparatus shown in the drawings serves to cut open a fowl, which is hanging by the ankle joints from a hook of an overhead conveyor. The apparatus comprises a frame 1, in which a not rotating vertical shaft 2 is mounted. Two supports 3 and 4 are rotatably mounted on the shaft 2, one above the other. Between the circular supports 3 and 4 a plurality of vertical guide means 6 are provided, which rigidly interconnect th supports 3 and 4 and are regularly spaced about the circumference thereof. On each guide means 6, which consists of a pair of mutually parallel guide rods 7, vertically reciprocatable slide block 8 is mounted, as is most clearly shown in FIG. 3. On the back side of each slide block 8 facing the central shaft 2, a follower roll 9 is provided, which co-operates with a stationary camming track 10 attached to the shaft 2. The shape of the camming track 10 has so been chosen, that the slide blocks 8 move up and down their guide means 6 as the guide means rotate about the central shaft 2 together with the supports 3 and 4.

The guide means 6 and the supports 3 and 4 are driven by a horizontal drive wheel 11 rotatably mounted on the shaft 2 above the upper support 3. The drive wheel 11 is rigidly connected with the upper support 3 by means of a connecting member 12.

The fowl to be opened are supplied by a conveyor having hooks 13 each adapted to support a fowl 14 by the ankle joints. Each conveyor hook 13 is carried by a shackle 15 having two rollers 16 supported by a rail 17. The shackles 15 of the conveyor are attached to a pulling cable 18 at regular intervals. A part of the rail 17 is concentric with the shaft 2 and positioned above the drive wheel 11, which has a series of notches 19 provided at regular intervals in the outer edge of the driving wheel 11. The distance between successive notches 19 corresponds with the distance between successive conveyor shackles 15, so that the shackles 15 as they are pulled along the rail 17 by the pulling cable 18, are received within the notches 19 as they reach the apparatus and so rotate the drive wheel 11 about the central shaft 2.

Each slide block 8 carries a cutting means provided with a generally U-shaped abutment member 20, which extends radially outwards from the slide block 8 and is brought between the legs of the fowl 14 hanging from a conveyor hook 13 as the fowl reaches the apparatus. The corresponding slide block 8 at that time is at it's extreme upper position of it's guide means 6. As the conveyor continues moving the fowl, the abutment member 20, being driven by the drive wheel 11, moves along with the fowl. At the same time the camming track 10 releases the slide block, so that the slide block 8 slides down along it's guide means 6 under the influence of it's own weight and the abutment member 20 grips the fowl 14 between it's legs. Because the downward movement of the slide block 8 is not forced by the camming track 10, this movement will stop as soon as the legs of the fowl 14 are tensioned between the conveyor hook 13 and the abutment member 20. Thus the downwardly stroke of the slide block 8 is always automatically adjusted to the size of the fowl 14.

The abutment member 20 is further provided with a pair of downwardly extending rods 21, which grip the fowl's back as the slide block 8 moves down.

The cutting means also comprises a ball shaped protrusion 22, which is inserted into the opening previously made in the fowl by cutting out it's vent, during the downward movement of the slide block 8. As the slide block 8 moves down the fowl is brought into the right position for receiving the protrusion 22 by the rods 21. The protrusion 22 consists of two separatable ball halves 23 and 24. The ball half 23 facing the central shaft 2 is rigidly connected with the abutment member 20, whereas the other ball half 24 is attached to the outer end of a lever arm 25, pivotably connected to the slide block 8 by means of a horizontal hinge 26, so that when the arm 25 is moved radially outwards, the ball halves 23 and 24 are spread apart. The spreading movement of the ball halves is attained by means of a follower 27 having a roller 28, which co-operates with a stationary camming surface 29 attached to the shaft 2. The shape of the camming surface 29 has so been chosen, that the arm 25 is operated as desired in synchronisation with the movements of the slide block 8.

The outer end of the arm 25 is further provided with a knife holder 30 holding a knife 31, which is partially received within a slit in the upper outer side of the movable ball half 24. The knife 31 is fastened within the holder 30 by means of a clamping screw 32.

The apparatus hereinbefore described operates as follows:

When a fowl 14 carried by the conveyor reaches the apparatus, the hook 13 from which the fowl 14 is hanging is brought into contact with a guide rail 33 attached to the lower support 4, so that the fowl 14 is positioned straight below the corresponding cutting means, the abutment member 20 of which is positioned between the legs of the fowl. The slide block 8 then moves down, so that the rods 21 are brought behind the fowl's back and the closed halves of the protrusion 22 are inserted into the fowl until the downward movement of the slide block is halted by the abutment member 20. Since the downward movement of the slide block 8 is adjusted to the size of the fowl 14 by means of the abutment member 20, the protrusion 22 will always have the same depth of penetration. The fowl's entrails are pushed away by the protrusion 22, so that they cannot be touched by the knife 31. Because the protrusion is ball shaped the entrails will not be damaged. Thereafter the arm 25 is swung radially outwards, so that the fowl 14 is cut open from it's vent opening in the direction of it's breast bone by the knife 31, which is partially exposed between the ball half 24 and the knife holder 30. Since the movable ball half 24 carrying the knife 31 swings about the hinge 26, the ball half 24 will at a certain point of it's path, automatically be given free again by the fowl 14. The exact position of the point at which the ball half 24 leaves the body of the fowl 14 will be determined by the size of the fowl, so that the cutting movement as well is adjusted to the size of the fowl 14. The slide block 8 is then moved upwards again by the camming track 10 and the arm 25 is pulled back by a spring 54, which is attached between the arm 25 and the lower support 4 and urges the roller 28 of the follower 27 of the arm 25 against the camming surface 29. It will be readily understood that the roller 28 may freely move up and down along the camming surface 29, so that the roller 28 always contacts the camming surface 29, irrespective of the movements of the slide block 8. Finally the fowl is removed from the apparatus by the conveyor.

Although for reasons of clarity only two of the cutting means are shown in the drawings, it will be understood that beneath each of the notches 19 of the drive wheel 11 a cutting means is provided, which is carried by a separate slide block 8 movable up and down on it's guide means 6.

It will be understood that the apparatus shown in the drawings and described in detail merely represents a preferred embodiment and that many variations and modifications are possible within the scope and spirit of the invention. Although for instance the protrusion 22 has been shown and described as being ball shaped it will be clear that the protrusion may have any other suitable shape, provided it has a smooth and somewhat rounded lower surface for pushing away the fowl's entrails without damage. It would also be possible to apply the teachings of the invention to the construction of a hand tool or semi-automatic tool for cutting open a fowl, which not necessarily has to be hanging from a conveyor hook. Such tool would not be carried by a revolving slide block movably mounted on a guide means and could be constructed in the manner of a pair of scissors or pliers, the lower ends of which forming a smooth rounded body when closed and having an outer cutting edge.

I claim:

1. An apparatus for cutting open the body cavity of a fowl, which is hanging by the ankle joints from a hook of an overhead conveyor and the vent of which has been cut out, comprising a frame;

at least one guide means movable connected to said frame;

means for moving said guide means along with the conveyor;

a slide block reciprocatably mounted on said guide means;

means allowing said slide block to move down along said guide means towards a fowl carried by said conveyor, and for moving said slide block up and away from said fowl; and a cutting means supported by said slide block; said cutting means comprising a generally rounded protrusion formed by two laterally separatable complementary segments, a knife attached to at least one of said segments, and means for moving said segments apart and together in synchronisation with the movements of said slide block;

said protrusion segments being adapted when closed to be inserted into the opening previously made in the fowl by cutting out the vent thereof, during the downward movement of said slide block, and thereafter to be separated so that said fowl is cut open by said knife.

2. Apparatus according to claim 1, wherein the protrusion segments are adapted to be separated in such direction, that said fowl is cut open from the vent towards the breast bone thereof.

3. Apparatus according to claim 1, wherein one of said protrusion segments is rigidly connected with said slide block, whereas the other of said protrusion segments is attached to the free outer end of a lever arm pivotably connected with said slide block, so that the protrusion segments may be separated in a scissor-like manner.

4. Apparatus according to claim 3, wherein said means for moving said protrusion segments apart comprise a stationary camming surface attached to said frame, and a follower element supported by said lever arm and bearing on said camming surface, said camming surface being so shaped, that said protrusion segments are separated and closed in the desired manner in synchronization with the movements of said slide block.

5. Apparatus according to claim 1, wherein said protrusion is of a generally ball shaped configuration.

6. Apparatus according to claim 4, wherein said protrusion is ball shaped and formed by two ball halves, said knife being held in the upper outer part of the movable ball half.

7. Apparatus according to claim 1, wherein the downward movement of said slide block is at least partially attained through the force of gravity, and the apparatus further comprises means for adapting the penetration depth of said protrusion;

said means comprising an abutment member attached to said slide block and extending between the fowl's legs, whereby the downward movement of said slide block is stopped when said abutment member comes to bear on the body of said fowl.

8. Apparatus according to claim 1, wherein said means for moving said slide block upwards away from said fowl comprise a stationary camming track attached to said frame, and a follower element carried by said slide block and bearing on said camming track.

9. Apparatus according to claim 1, wherein a plurality of said cutting means are provided, each carried by a said slide block movably mounted on a said guide means, and said apparatus further comprises a stationary vertical shaft and at least one generally circular horizontal support mounted for rotation on said central shaft;

said guide means of said plurality of cutting means being regularly spaced about the circumference of said support.

10. Apparatus according to claim 9, wherein said means for moving said guide means along with said conveyor comprise a horizontal drive wheel mounted for rotation on said central shaft and rigidly connected with said horizontal support, said drive wheel having a series of regularly spaced notches in the outer edge thereof adapted to be caught by the conveyor, so that the apparatus is driven by said conveyor.

11. Apparatus according to claim 10, wherein said means for moving said slide block of each of said plurality of cutting means comprise a stationary camming track attached to said central shaft, and a follower element carried by each of said slide blocks and bearing on said camming track.

12. A cutting tool for opening the body cavity of a fowl subsequent to cutting out the fowl's vent, comprising a pair of spreadable arms the lower ends of which closely fit together to form a rounded body having a continuous smooth face when inserted into a previously made opening of the fowl, at least one of said lower ends having a longitudinally extending cutting edge on the outer surface thereof facing away from the other of said lower ends, said cutting edge mounted outwardly and spaced from the periphery of said rounded body;

said tool being adapted to be inserted with the closed lower ends into the opening previously made in the body of said fowl by cutting out the vent thereof, and thereafter to be spread so that the fowl is cut open by said cutting edge.

13. Cutting tool according to claim 12, wherein said lower ends form a pair of ball halves, said cutting edge being located on the upper part of at least one of said ball halves.

14. Cutting tool according to claim 12, wherein said arms are hinged together in the manner of a pair of scissors.

15. Cutting tool according to claim 12, wherein said lower ends each are provided with a said cutting edge located on the upper part thereof, said cutting edges being diametrically opposed.

* * * * *